United States Patent [19]

Smotherman

[11] Patent Number: 5,261,496
[45] Date of Patent: Nov. 16, 1993

[54] WEEDWINDER

[76] Inventor: Robert J. Smotherman, 5430 Burkett La., Loomis, Calif. 95630

[21] Appl. No.: 939,018

[22] Filed: Sep. 2, 1992

[51] Int. Cl.⁵ ........................ A01B 33/06; A01D 9/06
[52] U.S. Cl. ........................................ 172/25; 294/50; 172/378
[58] Field of Search ................ 172/23, 25, 27, 28, 172/21, 22, 371, 372, 378, 523; 171/21, 22; 294/50, 50.5, 61

[56] References Cited

U.S. PATENT DOCUMENTS

| | | | |
|---|---|---|---|
| D. 322,918 | 1/1992 | Parks. | |
| 1,549,198 | 8/1925 | Haney. | |
| 2,250,313 | 7/1941 | Petz et al. | 294/50.5 |
| 2,402,550 | 6/1946 | Hiack | 294/50.5 |
| 2,593,283 | 4/1952 | Erlebach, Sr. | 294/50 |
| 2,680,643 | 6/1954 | Cravotta. | |
| 2,804,336 | 8/1957 | Thompson | 294/50 |
| 2,855,668 | 10/1958 | Ottenad et al. | 172/25 |
| 2,862,755 | 12/1958 | Gulden | 294/50 |
| 3,333,881 | 8/1967 | Hollinger. | |
| 3,596,966 | 8/1971 | Shredl | 294/50 |
| 3,633,958 | 1/1972 | Mesrobian | 294/50 |
| 3,663,050 | 5/1972 | Fuchs | 294/50 |
| 3,830,310 | 8/1974 | Williams | 172/22 |
| 4,603,744 | 8/1986 | Ramirez. | |
| 4,641,712 | 6/1986 | Cravotta. | |
| 4,723,802 | 2/1988 | Fambrough. | |
| 4,819,736 | 4/1989 | Hedgepeth. | |
| 5,004,283 | 4/1991 | Sullivan | 294/50 |
| 5,005,888 | 4/1991 | Parks et al. | 294/50 |

FOREIGN PATENT DOCUMENTS 211366  5/1956  Australia.

Primary Examiner—Randolph A. Reese
Assistant Examiner—Spencer Warnick
Attorney, Agent, or Firm—John P. O'Banion

[57] ABSTRACT

An apparatus (10) for rotary extraction of weeds and other vegetation by hand or by using a power driver. The apparatus includes a hollow guide tube (20) in which a shaft (16) is slidably disposed. A plurality of pointed rods (12) are coupled to shaft (16), and can be extended or retracted by movement of shaft (16) within the guide tube (20). The rods (12) are extended and inserted into the soil over the vegetation to be removed. Rotation of the apparatus winds the vegetation and its root around the rods (12) and removes it from the soil. The vegetation is then ejected from the apparatus by retracting the rods (12) and, if necessary, sliding the vegetation off of the tapered sleeve (30).

11 Claims, 4 Drawing Sheets

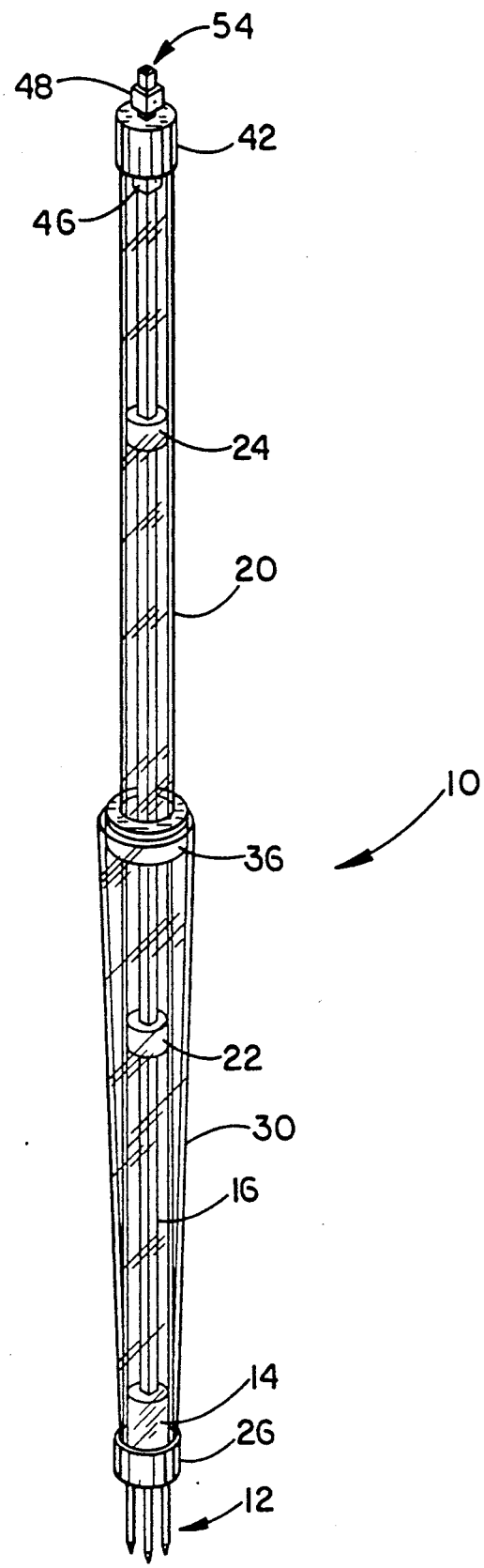
FIG.—1

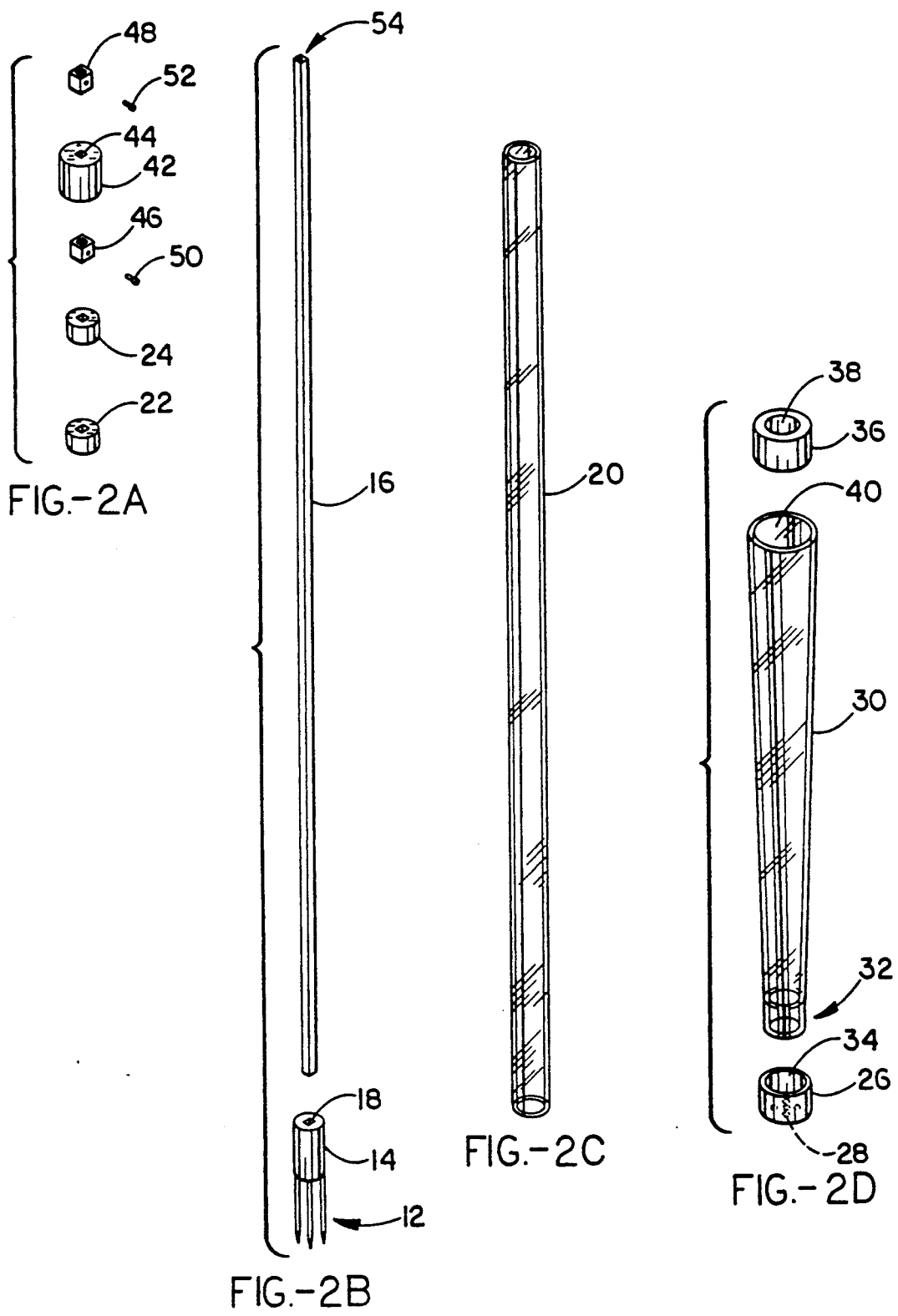

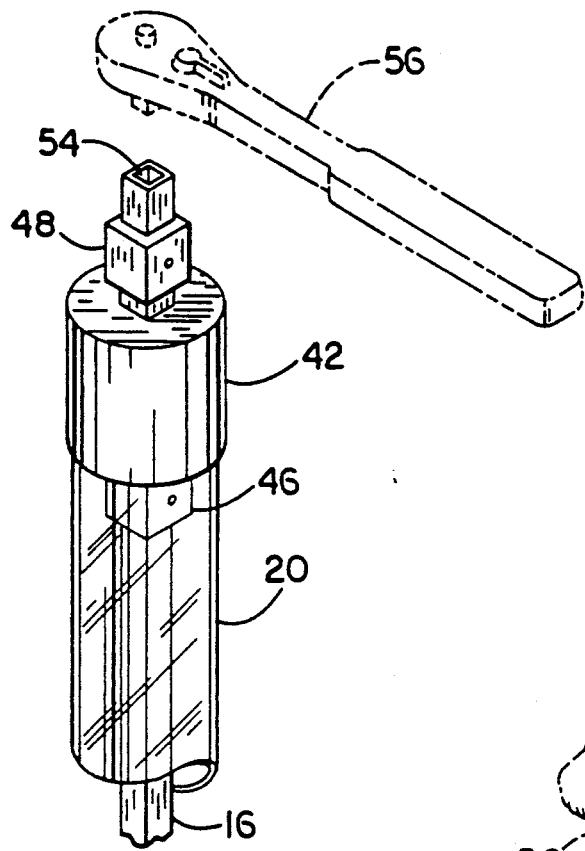
FIG.—3
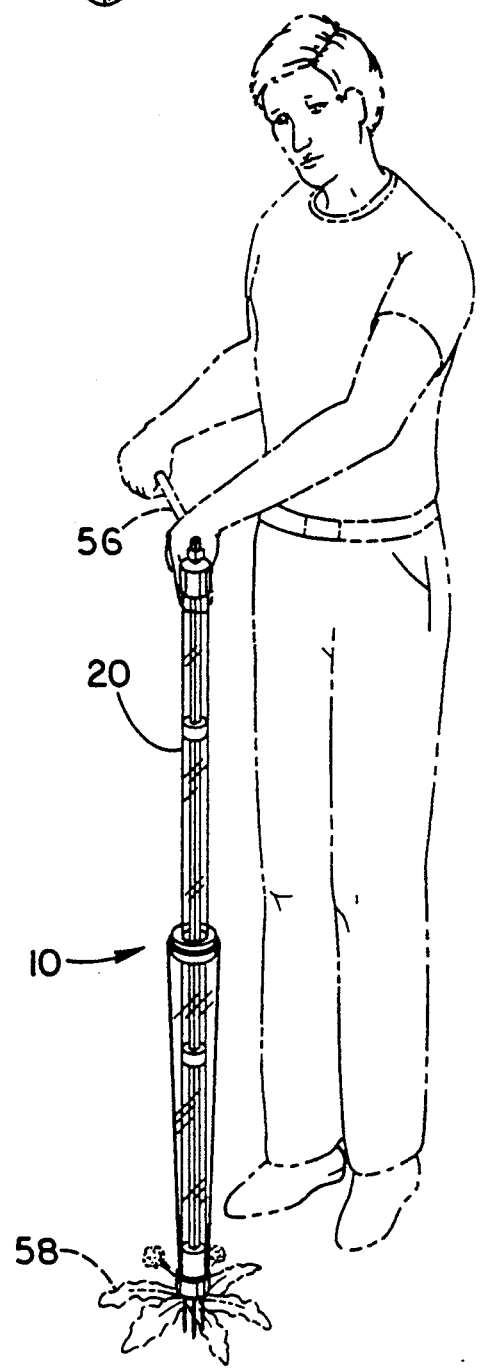
FIG.—4

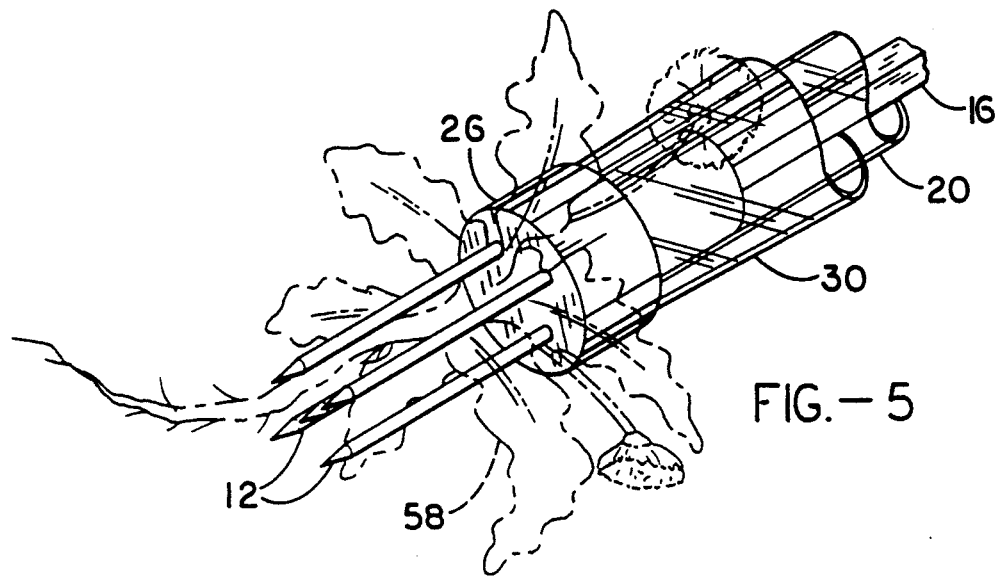
FIG.—5
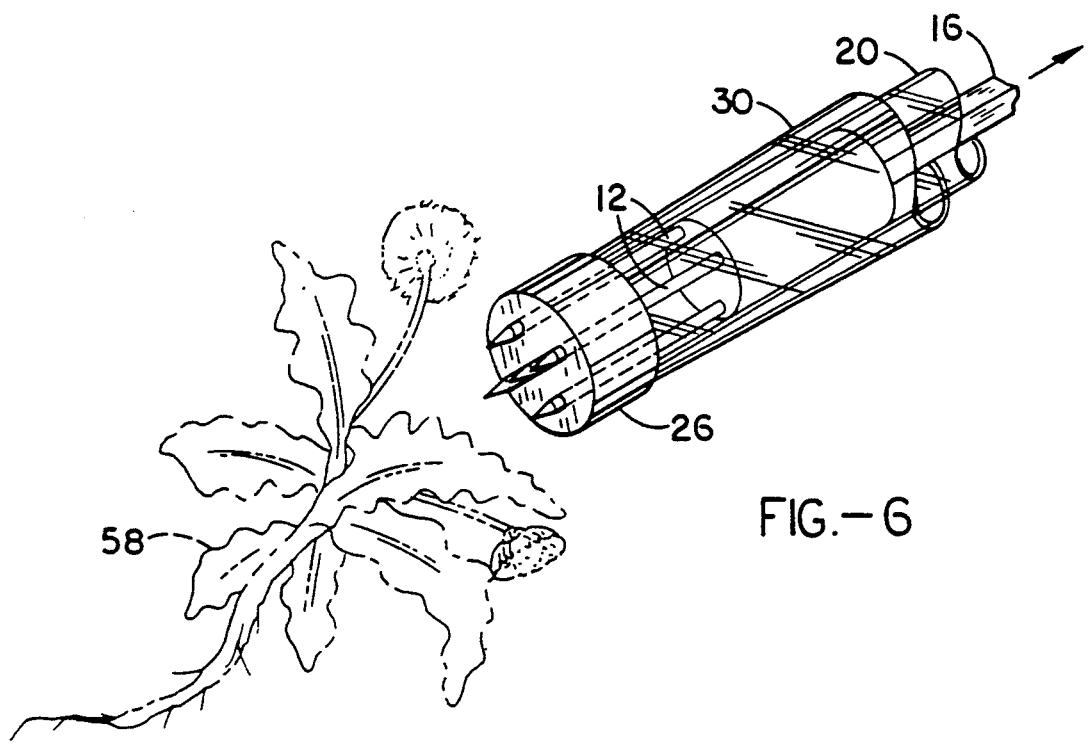
FIG.—6

WEEDWINDER

BACKGROUND OF THE INVENTION

1. Field of the Invention

This invention pertains generally to weed extraction devices, and more particularly to a device for rotary removal of weeds without entanglement.

2. Description of the Background Art

Weed removal from plant beds, lawns, and other vegetated areas can be a tedious task. To ease the removal of weeds, a number of devices have been developed which include forks, tines or cutters which can be forced into the soil surrounding the weed and operated to either extract or cut the weed. When weeds are cut, however, the root system remains and the weed will grow back over a period of time. Therefore, rotary extraction is preferred since the root can be removed intact.

For example, U.S. Pat. No. 4,819,736 issued to Hedgepeth on Apr. 11, 1989 discloses a weed removal tool in which the weeding head has three-prongs which are aligned in a flat plane. The center prong is longer than the outer prong so that it can be placed into the soil for stability. The end of the tool is adapted for connection to a hand held powering means such as a power screw driver, power drill, or socket wrench. Removal of the weed is effected by rotating the tool. U.S. Pat. No. 2,680,643 issued to Cravotta on Jun. 8, 1954 discloses a manually operated weed removal tool in which the weeding head has four prongs which are aligned at right angles. The tool contains an integral handle formed from the shaft connected to the weeding head. Removal of the weed is effected by rotating the tool. U.S. Pat. No. 4,641,712 issued to Cravotta on Feb. 10, 1987 discloses a rotary weed extractor which improves upon the device in U.S. Pat. No. 2,680,643 by (1) adding cutting edges to the weeding edge, (2) adding a foot support for application of additional force, and (3) adding a rotatable handle identical to those used with hand drills to insure that rotating the rod will cause blisters on the user's hand. U.S. Pat. No. 4,732,802 issued to Fambrough on Feb. 9, 1988 discloses a power operated rotary weeding tool which has three wingnut-like members spaced along a shaft. The tool drills down into the earth while at the same time causing the weed to wrap around the shaft. The entire root of the weed can then be popped out. The tool is operated by a power drill or the like, or a manual device. U.S. Pat. No. 4,603,744 issued to Ramirez on Aug. 5, 1986 discloses a manually operated weeding tool which has a crank handle like those used with hand drills and a two-prong weeding head. The tool also includes a weed ejecting mechanism. U.S. Pat. No. 1,549,198 issued to Haney on Aug. 11, 1925 discloses a weed removal tool which has a plurality of prongs and one end and a handle at the other. The prongs diverge as the tool is thrust into the ground, thereby defining an area of removal. The tool is rotated and a plug of earth surrounding the weed is removed. An ejecting mechanism is also provided. U.S. Pat. No. 3,333,881 issued to Hollinger on Aug. 1, 1967 discloses a tool having two prongs for surrounding the root of the weed during removal. Rotation of the tool removes the weed and root, and the tool can be used for transplanting plugs of grass. A second embodiment is disclosed for picking up trash or aerating the lawn. Australian No. 211,366 applied for by Tomlinson et al. and published May 24, 1956 discloses a manually operated rotary weeding tool nearly identical to that disclosed in U.S. Pat. No. 2,680,643 except that the prongs are curved and are provided with cutting edges. U.S. Pat. No. D-322,918 issued to Parks et al. on Jan. 7, 1992 discloses a design for a manually operated weeding device having a pair of straight prongs for insertion into the soil.

The devices disclosed in the foregoing patents suffer from various disadvantages, most notably that they have not solved the problem of entanglement of the weed and the device. In addition, in many of those devices, ejection of the weed from the extraction head is difficult. As a result, the user must unwrap or cut the weed in order to remove it from the device. Therefore, a need exists for a rotary weed extraction tool which can effectively remove the weed and its roots, while at the same time providing for ease of ejection of the weed and minimizing entanglement.

The foregoing patents reflect the state of the art of which the applicant is aware and are tendered with the view toward discharging applicant's acknowledged duty of candor in disclosing information which may be pertinent in the examination of this application. It is respectfully stipulated, however, that none of these patents teach or render obvious, singly or when considered in combination, applicant's claimed invention.

SUMMARY OF THE INVENTION

The present invention overcomes the deficiencies in existing rotary weed extraction devices by employing a configuration and structure which provides for ease of weed ejectment and minimal entanglement of the weed with the device.

By way of example and not of limitation, the present invention generally comprises an elongated cylindrical housing of either uniform diameter or, preferably, having a taper toward the weed extraction end. The weed extraction end of the housing is covered with a cap which has a plurality of holes. Several long, pointed rods extend through the holes in the cap and are coupled to one end of a shaft which slides within the housing. By sliding the shaft in and out of the housing, the rods can be withdrawn into the housing or extended outward. The other end of the shaft includes a receptacle for coupling to a standard manual wrench ratchet handle, motorized ratchet handle, electric drill, power-take-off of a tractor, or the like.

In hand operation, the rods are placed over the root of the weed at ground level and pushed into the soil, and the ratchet is turned. This imparts a twisting motion to the rods which removes the weed and its root. Removal of the root with the twisting motion is a distinct advantage over other tools because no digging is required and a minimal amount of dirt is removed. Motorized operation is substantially the same.

For large weeds or vines, the vegetation might wrap around the rods and housing when the ratchet is turned. By sliding the shaft out of the housing, the rods will retract and the weed will easily slide off of the rods. Similarly, because the housing is tapered, only slight effort is required to slide the vegetation off of the housing.

An object of the invention is to provide for rotary extraction of weeds.

Another object of the invention is to extract weeds with minimal removal of soil.

Another object of the invention is to remove a weed and its root system.

Another object of the invention is to provide for easy ejection of a removed weed.

Another object of the invention is to minimize entanglement of a weed during removal.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 1 is a perspective view of the apparatus of the present invention.

FIGS. 2A through 2D present an exploded view of the apparatus of FIG. 1.

FIG. 3 shows the upper portion of the apparatus of FIG. 1 in context of attachment to a ratchet shown in phantom.

FIG. 4 is a diagrammatic view of the apparatus of FIG. 1 positioned for extraction of a weed shown in phantom.

FIG. 5 is a diagrammatic view of the lower end of the apparatus of FIG. 1 extracting a weed shown in phantom.

FIG. 6 is a diagrammatic view of the lower end of the apparatus of FIG. 1 ejecting an extracted weed shown in phantom.

DESCRIPTION OF THE PREFERRED EMBODIMENTS

Referring more specifically to the drawings, for illustrative purposes the present invention is embodied in the apparatus generally shown in FIG. 1 and FIG. 2A through FIG. 2D. It will be appreciated that the apparatus may vary as to configuration and as to details of the parts without departing from the basic concepts as disclosed herein.

Referring to FIG. 1 and FIGS. 2A through 2D, the present invention provides a weed extraction device 10 which includes a plurality of spaced-apart rods 12 for insertion into the soil and the area surrounding root of a weed or other vegetation to be removed. Rods 12 are preferably slender, cylindrical, rigid, and elongated rods with sharp points at their proximal ends. The distal ends of rods 12 are attached to a cylindrical-shaped coupling 14. For removal of vegetation in lawn areas, it is preferred that one rod be placed in the center of the coupling with four rods radially disposed around the center rod. For removal of vegetation in areas with rocks, it is preferred that the rods be positioned in a straight line for a fork-like configuration. Those skilled in the art will appreciate that other placement patterns can be employed.

A shaft 16 is attached to coupling 14 by insertion into an opening 18 which is coaxially positioned in coupling 14 and which frictionally engages shaft 16. Alternatively, shaft 16 could be welded, glued, integrally joined to, or otherwise attached to coupling 14. Shaft 16 is coaxially positioned within a hollow guide tube 20. Guide tube 20 has an inner diameter approximately equalling the outer diameter of coupling 14. Bushings 22, 24 which have diameters equalling that of coupling 14 are threaded onto shaft 16 to serve as spacers between shaft 16 and guide tube 20. I this manner, shaft 16 will slide within guide tube 20.

Covering the proximal end of guide tube 20 is a cap 26 having a plurality of holes 28 through which rods 12 extend. Cap 26 serves to guide and stabilize rods 12, as well as to prevent the travel of coupling 14 beyond the proximal end of guide tube 20.

While shown as having a square shape, shaft 16 could be cylindrical, rectangular, flattened or the like without departing from the concepts disclosed herein. Similarly, while guide tube 20 and bushings 22, 24 are shown as being cylindrically-shaped, they could be square, rectangular, or flattened or the like.

Although the apparatus will function adequately with shaft 16 sliding within guide tube 20 as described above, in the preferred embodiment guide tube 20 is coaxially positioned within a conically-shaped hollow sleeve 30. The proximal ends of guide tube 20 and sleeve 30 are aligned to terminate at substantially the same point, and cap 26 covers the proximal end of sleeve 30 as well as the proximal end of guide tube 20. Sleeve 30 tapers from its distal end toward its proximal until it reaches a point at which the diameter of sleeve 30 becomes substantially uniform to form a tip 32 which mates with receptacle 34 in cap 26.

Located at the distal end of sleeve 30 is a plug 36 through which a hole 38 coaxially extends. Plug 36 is threaded over guide tube 20 and inserted into a receptacle 40 located in the distal end of sleeve 30. By fabricating plug 36 from a resilient material such as rubber or the like, plug 36 can be press fitted into receptacle 40 which will cause plug 36 to compress and frictional engage guide sleeve 20 to hold it in position. Alternatively, plug 36 could be welded, glued or otherwise attached to sleeve 30 and guide tube 20 to join them in a fixed position.

Positioned over the distal end of guide tube 20 is a cap 42 having a coaxially disposed hole 44 through which shaft 16 extends. Positioned over shaft 16 on each side of cap 42 are collars 46, 48 which are fixed in place by set screws 50, 52, respectively, or other means of attachment. When shaft 16 slides out of guide tube 20, collar 46 will limit its travel by engaging the inner surface of cap 42. Collar 46 is therefore adjusted to limit the amount of retraction of rods 12 relative to the proximal end of guide sleeve 20. When shaft 16 slides into guide tube 20, collar 48 will limit its travel by engaging the outer surface of cap 42. Collar 48 is therefore adjusted to limit the amount of extension of rods 12 relative to the proximal end of guide sleeve 20. Referring also to FIG. 3, a receptacle 54 is placed in the distal end of shaft 16 so that shaft 16 is configured and structured for coupling to a standard manual ratchet wrench handle 56. Alternatively, shaft 16 could be adapted for coupling to an electric drill, a motorized ratchet handle, the power-take-off of a tractor, or the like.

The components described herein can be fabricated from lightweight, rigid materials such as high impact plastic, aluminum, stainless steel, or the like. Preferably, rods 12, coupling 14, and cap 22 are fabricated from corrosion resistant materials since they will be exposed to water and soil acids.

Referring now to FIG. 4 and FIG. 5, in a typical application the user positions the apparatus over the central portion of a weed 58 and extends rods 12 into the weed and surrounding soil. Guide tube 20 is then grasped with one hand and ratchet 56 rotated with the other hand. Rotation is continued until the weed and, most importantly, its root wraps around rods 12 and is removed from the soil. Referring also to FIG. 6, to eject the weed from the apparatus the user slides shaft 16 toward the distal end of guide tube 20 thereby causing rods 12 to retract and the weed 58 to fall off. In the event that large vegetation is removed and in the removal process the vegetation wraps around sleeve 30, the user can easily slide the weed off of the apparatus due to the taper extending toward its proximal end.

Accordingly, it will be seen that this invention provides for the efficient and complete removal of a weed or other vegetation and its root system, and eliminates entanglement which occurs in other extraction devices. Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. An apparatus for removing vegetation from soil, comprising:
   (a) a guide tube, said guide tube having a proximal end and a distal end;
   (b) a shaft, said shaft having a proximal end and a distal end, said shaft slidably disposed within said guide tube;
   (c) stop means for limiting the extent of travel of said shaft within said guide tube;
   (d) a plurality of rods, each of said rods having a first end coupled to said proximal end of said shaft, each of said rods having a tapered second end;
   (e) coupling means for coupling said distal end of said shaft to a source of rotary force, whereby said source of rotary force is used to rotate said shaft about its longitudinal axis; and
   (f) a hollow sleeve, said sleeve having a proximal end and a distal end, said sleeve being tapered from said distal end toward said proximal end, said guide tube disposed within said sleeve, said proximal end of said guide tube being aligned with said proximal end of said sleeve, said sleeve coupled to said guide tube.

2. An apparatus as recited in claim 1, wherein said stop means comprises:
   (a) a first cap, said first cap coupled to said proximal end of said sleeve;
   (b) a second cap, said second cap coupled to said distal end of said guide tube; and
   (c) a plurality of collars, each of said collars including an opening through which said shaft extends, each of said collars coupled to said shaft, at least one of said collars positioned on said shaft within said guide tube, at least one of said collars positioned on said shaft in proximity to said coupling means.

3. An apparatus as recited in claim 2, further comprising a plurality of bushings, each said busing including an opening through which said shaft extends, said bushings disposed between said shaft and said guide tube.

4. A weed extraction device, comprising:
   (a) an elongated shaft having a proximal end and a distal end, said distal end including a receptacle configured and structured for coupling to a source of rotary motion;
   (b) a plurality of rods, each of said rods having a first end coupled to said proximal end of said shaft, each of said rods having a pointed second end;
   (c) a guide tube, said guide tube having a proximal end and a distal end, said shaft coaxially and slidably disposed within said guide tube, said proximal end of said shaft oriented with said proximal end of said guide tube; and
   (d) a sleeve, said sleeve having a proximal end and a distal end, said guide tube coaxially disposed within said sleeve, said guide tube coupled to said sleeve, said proximal end of said guide tube aligned with said proximal end of said sleeve.

5. An apparatus as recited in claim 4, further comprising a coupling, said coupling disposed between said shaft and said rods.

6. An apparatus as recited in claim 5, further comprising a first cap, said cap including a plurality of openings through which said rods extend, said cap coupled to said proximal end of said sleeve.

7. An apparatus as recited in claim 6, further comprising a second cap, said second cap including an opening through which said shaft extends, said second cap coupled to said guide tube.

8. An apparatus as recited in claim 7, further comprising a plurality of collars, each of said collars including an opening through which said shaft extends, at least one of said collars positioned for engagement with said second cap when said shaft if moved toward said proximal end of said guide tube, at least one of said collars positioned for engagement with said second cap when said shaft is moved toward said distal end of said guide tube.

9. An apparatus as recited in claim 8, further comprising a plug, said plug including an opening through which said guide tube extends, said plug disposed between said guide tube and said sleeve at said distal end of said sleeve.

10. A rotary weed extractor, comprising:
    (a) an elongated central shaft, said shaft having a first end and a second end, said first end of said shaft configured and structured for coupling to a source of rotary motion;
    (b) a coupling, said coupling having a first end and a second end, said first end of said coupling joined to said second end of said shaft;
    (c) a plurality f cylindrical rods, each of said rods having a first end joined to said second end of said coupling, each of said rods having a pointed second end;
    (d) a guide tube, said guide tube having a first end and a second end, said shaft coaxially disposed within said guide tube, said shaft slidably engaging said guide tube, said first end of said shaft oriented with said first end of said guide tube;
    (e) a first cap, said first cap including a plurality of openings through which said rods extend, said first cap covering said second end of said guide tube;
    (f) a second cap, said second cap including a coaxially disposed opening, said shaft extending trough said opening, said second cap covering said first end of said guide tube; and
    (g) a plurality of collars, each of said collars including an opening through which said shaft extends, at least one of said collars positioned for engagement with said second cap when said shaft is moved toward said first end of said guide tube, at least one of said collars positioned for engagement with said second cap when said shaft is moved toward said second end of said guide tube.

11. An apparatus as recited in claim 10, further comprising a sleeve, said sleeve having a first end and a second end, said guide tube coaxially disposed within said sleeve, said guide tube fixedly coupled to said sleeve, said second end of said guide tube aligned with said second end of said sleeve, said first cap covering said second end of said sleeve.

* * * * *